United States Patent
Osawa et al.

(10) Patent No.: US 7,563,844 B2
(45) Date of Patent: Jul. 21, 2009

(54) ORGANOSILICONE RESIN EMULSION COMPOSITION AND ARTICLE HAVING COATING THEREOF

(75) Inventors: Yoshihito Osawa, Usui-gun (JP); Akira Yamamoto, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 443 days.

(21) Appl. No.: 11/332,210

(22) Filed: Jan. 17, 2006

(65) Prior Publication Data

US 2006/0167176 A1      Jul. 27, 2006

(30) Foreign Application Priority Data

| Jan. 24, 2005 | (JP) | ............................... 2005-015807 |
| Jun. 27, 2005 | (JP) | ............................... 2005-186264 |

(51) Int. Cl.
 *C08L 83/04* (2006.01)
 *C08K 5/05* (2006.01)
(52) U.S. Cl. ...................................... 524/588; 524/376
(58) Field of Classification Search .................. 524/588
 See application file for complete search history.

(56) References Cited

U.S. PATENT DOCUMENTS

| 4,265,797 A | * | 5/1981 | Suk ............................. 524/389 |
| 4,383,062 A | * | 5/1983 | Saad et al. ...................... 524/35 |
| 4,446,044 A |   | 5/1984 | Rutkiewic et al. |
| 4,518,727 A | * | 5/1985 | Traver .......................... 524/35 |
| 4,525,502 A | * | 6/1985 | Traver .......................... 524/96 |
| 4,529,758 A | * | 7/1985 | Traver .......................... 524/43 |
| 4,582,874 A | * | 4/1986 | Grape et al. ................... 524/588 |
| 4,778,624 A |   | 10/1988 | Ohashi et al. |
| 4,940,743 A |   | 7/1990 | Grape et al. |
| 5,202,368 A | * | 4/1993 | Davies et al. ................ 524/266 |
| 6,025,077 A | * | 2/2000 | Yamaki et al. ............... 428/447 |
| 6,048,910 A | * | 4/2000 | Furuya et al. ................. 522/86 |
| 6,087,064 A | * | 7/2000 | Lin et al. ................... 430/270.1 |
| 6,521,699 B2 | * | 2/2003 | Feder et al. .................. 524/588 |
| 2001/0031818 A1 | * | 10/2001 | Feder et al. .................. 524/442 |
| 2005/0227893 A1 | * | 10/2005 | Johnson et al. ............. 510/367 |

FOREIGN PATENT DOCUMENTS

| JP | 6-172649 | 6/1994 |
| JP | 7-247434 | 9/1995 |
| JP | 7-316432 | 12/1995 |
| JP | 2000-63756 | 2/2000 |

OTHER PUBLICATIONS

Solubility Parameters: Theory and Application (http://aic.stanford.edu/sg/bpg/annual/v03/bp03-04.html), published on the web on Sep. 5, 2004.*

Kirk-Othmer, Concise Encyclopedia of Chemical Technology; John Wiley & Sons, Inc.: New York, NY, 1985, pp. 1091-1092.

* cited by examiner

*Primary Examiner*—Randy Gulakowski
*Assistant Examiner*—Robert Loewe
(74) *Attorney, Agent, or Firm*—Oblon, Spivak, McClelland, Maier & Neustadt, P.C.

(57) ABSTRACT

An organosilicone resin emulsion composition comprising (A) an organosilicone resin having the compositional formula: $[RSiO_{3/2}]_m[R_2SiO]_n$ wherein R is a monovalent organic group, m is from 0.2 to 1.0, and n is from 0 to 0.8, (B) a water-miscible organic solvent having an SP value of 8.0-11.0, (C) an emulsifier, and (D) water, the composition being substantially free of an organic solvent other than component (B), has good water resistance, weather resistance, and stability and is free of environmental problems. An article having a coating of the composition formed thereon is also provided.

17 Claims, No Drawings

ORGANOSILICONE RESIN EMULSION COMPOSITION AND ARTICLE HAVING COATING THEREOF

CROSS-REFERENCE TO RELATED APPLICATION

This non-provisional application claims priority under 35 U.S.C. §119(a) on Patent Application Nos. 2005-015807 and 2005-186264 filed in Japan on Jan. 24, 2005 and Jun. 27, 2005, respectively, the entire contents of which are hereby incorporated by reference.

TECHNICAL FIELD

This invention relates to organosilicone resin emulsion compositions suitable for use as coatings on exteriors of structures and buildings, and articles having coatings of the compositions formed thereon.

BACKGROUND ART

In the paint and coating fields, it is lately required from the standpoints of avoiding environmental pollution and maintaining a safe working environment, to change the dispersing media from organic solvents to aqueous media. To meet the requirement, emulsion type coating compositions having radical polymerizable vinyl monomers emulsion polymerized as typified by acrylic resins are widely utilized as the base material of coating compositions because of their film formability and chemical resistance. The coating compositions of this type, however, have the drawback that they are essentially less resistant to water and weather.

On the other hand, silicone resins which are obtained through hydrolysis and condensation of silane compounds draw attention as coating compositions because they are able to form films having a high hardness and exhibiting good properties including weather resistance, water resistance, heat resistance and water repellency. However, the emulsion polymerization process of obtaining silicone resin by polymerizing monomers in emulsion has not been established. As the general rule, silicone resin solutions are prepared in organic solvent systems such as toluene and xylene and then emulsified without isolation.

Instability is one problem associated with these organic solvent-containing silicone resin emulsions. In addition, the environmental concern requires to control the use of organic solvents such as toluene and xylene.

The patent publications pertinent to the present invention include JP-A 6-172649 (U.S. Pat. No. 5,264,027), JP-A 7-247434, JP-A 7-316432, and JP-A 2000-63756.

DISCLOSURE OF THE INVENTION

An object of the present invention is to provide an organosilicone resin emulsion composition which has good water resistance, weather resistance, and stability and is free of environmental problems; and an article having a coating of the composition formed thereon.

The inventor has found that an organosilicone resin emulsion composition comprising (A) 100 parts by weight of an organosilicone resin having the compositional formula: $[RSiO_{3/2}]_m[R_2SiO]_n$ wherein R is each independently a monovalent organic group of 1 to 20 carbon atoms, m is a number of 0.2 to 1.0, and n is a number of 0 to 0.8, (B) 2 to 50 parts by weight of a water-miscible organic solvent having an SP value of 8.0 to 11.0, (C) 1 to 50 parts by weight of an emulsifier, and (D) 25 to 2,000 parts by weight of water, where an organic solvent other than component (B) is substantially absent, gives rise to no environmental problem and remains fully stable; and that an article having a coating of the composition formed thereon exhibits good water resistance and weather resistance.

Accordingly, the present invention provides an organosilicone resin emulsion composition comprising (A) 100 parts by weight of an organosilicone resin having the compositional formula: $[RSiO_{3/2}]_m[R_2SiO]_n$ wherein R is each independently a monovalent organic group of 1 to 20 carbon atoms, m is a number of 0.2 to 1.0, and n is a number of 0 to 0.8, (B) 2 to 50 parts by weight of a water-miscible organic solvent having an SP value of 8.0 to 11.0, (C) 1 to 50 parts by weight of an emulsifier, and (D) 25 to 2,000 parts by weight of water, the composition being substantially free of an organic solvent other than component (B).

The present invention also provides an article comprising a substrate and a coating of the organosilicone resin emulsion composition formed on a surface thereof.

As used herein, the language "being substantially free of an organic solvent other than component (B)" includes not only the situation where the composition does not contain an organic solvent other than component (B), but also the situation where the composition is substantially free of an organic solvent other than component (B), that is, the composition may contain insubstantial or trace amounts of organic solvents other than component (B) that do not affect the safety or raise an environmental problem. For example, the composition may contain organic solvents other than component (B) in amounts of up to 3% by weight, preferably up to 2% by weight, more preferably up to 1% by weight, based on the weight of the entire organic solvents.

BENEFITS

According to the invention, there is available a stable emulsion of silicone resin that forms a high hardness film possessing satisfactory weather resistance.

BEST MODE FOR CARRYING OUT THE INVENTION

The present invention provides an organosilicone resin emulsion composition comprising (A) an organosilicone resin having the compositional formula: $[RSiO_{3/2}]_m[R_2SiO]_n$, (B) a water-miscible organic solvent having an SP value of 8.0 to 11.0, (C) an emulsifier, and (D) water, the composition being substantially free of an organic solvent other than component (B).

Component (A) is an organosilicone resin having the compositional formula: $[RSiO_{3/2}]_m[R_2SiO]_n$ wherein R may be the same or different and is a monovalent organic group of 1 to 20 carbon atoms, m is a number of 0.2 to 1.0, and n is a number of 0 to 0.8.

More particularly, R is independently selected from monovalent organic groups of 1 to 20 carbon atoms, for example, alkyl groups such as methyl, ethyl, propyl, butyl, pentyl, hexyl, heptyl, octyl, nonyl, decyl, dodecyl, tetradecyl, hexadecyl, octadecyl, cyclopentyl, cyclohexyl and cycloheptyl, aryl groups such as phenyl, tolyl and naphthyl, alkenyl groups such as vinyl and allyl, and substituted forms of the foregoing groups in which some hydrogen atoms on the organic group structure are replaced by halogen atoms or organic groups containing a polar group such as amino, acryloxy, methacryloxy, epoxy, mercapto or carboxyl. In the invention, it is preferred that at least 30 mol % of R be methyl groups and at least 10 mol % of R be phenyl groups.

The molar fraction (m) of [$RSiO_{3/2}$] units in the silicone resin is in a range of 0.2 to 1.0, preferably 0.3 to 1.0, more preferably 0.4 to 1.0. With m of less than 0.2, the coating has a low hardness and becomes less durable. The molar fraction (n) of [$R_2SiO$] units in the silicone resin is in a range of 0 to 0.8, preferably 0 to 0.7, more preferably 0 to 0.6. With n of more than 0.8, the coating has a low hardness and becomes less durable.

The organosilicone resins defined above may be prepared by well-known methods. For example, they may be prepared through hydrolysis and condensation reaction of chlorosilanes or alkoxysilanes corresponding to the desired units. It is noted that such organosilicone resins are usually handled in a state diluted with organic solvents such as toluene and xylene because they are solid if the content of [$RSiO_{3/2}$] units is high, or they are prone to gel if condensation reactivity is high. In the invention, such organic solvents for dilution should be replaced by the water-miscible organic solvent (B). Alternatively, the water-miscible organic solvent (B) should be used as the solvent during organosilicone resin preparation.

It is acceptable that trace amounts of [$R_3SiO_{1/2}$] units (wherein R is as defined above) and/or [$SiO_2$] units are incorporated in component (A) as long as they do not adversely affect cure. In such a case, m+n is preferably in a range of 0.8 to 1.0, more preferably 0.9 to 1.0. If m+n is not equal to 1.0, the balance consists of [$R_3SiO_{1/2}$] and [$SiO_2$] units, with the total of all such units being 1.0.

Component (B) is a water-miscible organic solvent having an SP value of 8.0 to 11.0. This organic solvent is used to impart fluidity to the organosilicone resin (A) when the resin is emulsified. The organic solvent should have a Hildebrand solubility parameter (SP) value of 8.0 to 11.0 and be water-miscible.

An organic solvent with an SP value of less than 8.0 fails to uniformly dissolve the organosilicone resin whereas an organic solvent with an SP value of more than 11.0 forms, following emulsification, an emulsion which is less stable. For this reason, the SP value should be from 8.0 to 11.0, and preferably from 8.5 to 10.5.

Also the organic solvent should be water-miscible. If the organic solvent is not water-miscible, the emulsion formed by emulsification becomes less stable. The water-miscibility corresponds to a solubility of at least 1 g, preferably at least 3 g, in 100 g of water at 20° C.

Suitable water-miscible organic solvents include alcoholic compounds, ketone compounds, ester compounds and ether compounds, of which those compounds having an alkylene oxide unit being preferred. Examples include cellosolve, propyl cellosolve, butyl cellosolve, propylene glycol monomethyl ether, propylene glycol monobutyl ether, dipropylene glycol monomethyl ether, carbitol, methyl carbitol, propyl carbitol, butyl carbitol, cellosolve acetate, butyl cellosolve acetate, propylene glycol monomethyl ether acetate, carbitol acetate, and butyl carbitol acetate. Preferred of these are butyl cellosolve, butyl cellosolve acetate, propylene glycol monomethyl ether and propylene glycol monomethyl ether acetate (PGMEA), which are commonly used as film-forming aid in coating compositions.

An amount of component (B) added is 2 to 50 parts by weight per 100 parts by weight of component (A). Less than 2 pbw of component (B) forms an organosilicone resin solution which has a high viscosity and is difficult to emulsify. More than 50 pbw of component (B) is acceptable with respect to properties, but such an excess is unwanted because it will volatilize off to the environment during use. The preferred amount of component (B) added is 3 to 40 parts by weight, more preferably 5 to 30 parts by weight per 100 parts by weight of component (A).

It is noted that the organosilicone resin solution diluted with the water-miscible organic solvent should preferably have a viscosity of 500 to 100,000 mPa·s at 25° C., especially 1,000 to 50,000 mPa·s at 25° C. The viscosity may be measured by a rotational viscometer.

Component (C) is an emulsifier. The emulsifier is not particularly limited as long as it is effective for emulsifying and dispersing the water-miscible organic solvent solution of organosilicone resin in water. Suitable emulsifiers include nonionic surfactants such as polyoxyethylene alkyl ethers, polyoxyethylene propylene alkyl ethers, polyoxyethylene alkyl phenyl ethers, and polyoxyethylene fatty acid esters; anionic surfactants such as alkylsulfates, alkylbenzenesulfonates, alkylsulfosuccinates, alkylphosphates, polyoxyethylene alkyl ether sulfates, and polyoxyethylene alkyl phenyl ether sulfates; cationic surfactants such as quaternary ammonium salts and alkylamine acetic acid salts; and ampholytic surfactants such as alkyl betaines and alkyl imidazolines.

Inter alia, the nonionic surfactants such as polyoxyethylene alkyl ethers, polyoxyethylene propylene alkyl ethers, and polyoxyethylene alkyl phenyl ethers are preferred for stability. Specific examples include polyoxyethylene octyl ether, polyoxyethylene nonyl ether, polyoxyethylene decyl ether, polyoxyethylene propylene decyl ether, polyoxyethylene lauryl ether, polyoxyethylene propylene lauryl ether, polyoxyethylene tridecyl ether, polyoxyethylene propylene tridecyl ether, polyoxyethylene myristyl ether, polyoxyethylene cetyl ether, polyoxyethylene stearyl ether, polyoxyethylene octyl phenyl ether, polyoxyethylene nonyl phenyl ether, polyoxyethylene styrenated phenyl ether, etc. These emulsifiers may be used alone or in admixture.

An amount of component (C) added is 1 to 50 parts by weight per 100 parts by weight of component (A). Less than 1 pbw of component (C) is difficult to emulsify whereas more than 50 pbw of component (C) results in a coating which is lower in hardness, transparency and adhesion to a substrate. The preferred amount of component (C) added is 2 to 30 parts by weight, more preferably 3 to 20 parts by weight per 100 parts by weight of component (A).

In the organosilicone resin emulsion composition of the invention, water is used as component (D). The emulsion composition may be prepared by combining the water-miscible organic solvent solution of organosilicone resin, the emulsifier and water, and emulsifying and dispersing in a conventional manner.

An amount of component (D) or water used is 25 to 2,000 parts by weight, preferably 50 to 1,000 parts by weight per 100 parts by weight of component (A).

The emulsion composition thus obtained should preferably have a nonvolatile content (or solids content) of 5 to 80% by weight, more preferably 10 to 70% by weight.

The emulsion composition should preferably have an average particle size of 50 to 1,000 nm, more preferably 100 to 800 nm. It is noted that the average particle size may be measured by a particle size distribution instrument N4Plus (Coulter).

In the organosilicone resin emulsion composition of the invention, hydroxyl and alkoxy groups remaining in the organosilicone resin may crosslink and cure by the heat associated with the heating step for removing water and the solvent as component (B). For the purpose of accelerating the cure rate or enabling cure at lower temperature, a condensation catalyst may be added to the emulsion composition on use. Suitable condensation catalysts include sodium hydroxide, potassium hydroxide, sodium carbonate, sodium hydrogen carbonate, sodium acetate, potassium acetate, sodium methylate, potassium methylate, n-hexylamine, and tributylamine. The condensation catalyst is preferably added in an amount of 0.01 to 5 parts by weight, more preferably 0.1 to 3 parts by weight per 100 parts by weight of component (A).

In the practice of the invention, the organosilicone resin emulsion composition may be used in combination with an acrylic resin emulsion, urethane resin emulsion or the like. On such combined use, they are preferably blended such that component (A) from the organosilicone resin emulsion composition accounts for 10 to 90% by weight of the mixture.

On use, the organosilicone resin emulsion compositions of the invention may be coated onto surfaces of transparent or opaque substrates such as metals, ceramic inorganic materials, glass, wood, paper items, and plastics, and cured at room temperature or by heating, thereby forming cured protective coatings on the substrates. These cured protective coatings have a high hardness, sufficient flexibility, good adhesion, weather resistance, and may even impart water repellency. Thus the organosilicone resin emulsion compositions are suited as primers on exterior building members of metals, ceramics and wood, coating compositions such as topcoat compositions, protective coating compositions on metal surfaces as typified by precoated metals, electric charge modifying coating compositions for electrophotographic carriers, and adhesives.

Where the substrates are made of metals, the organosilicone resin emulsion compositions may be used for prime-coating like surface protection or anti-corrosion coating on building structural members of steel and stainless steel and building members and sashes of aluminum; coatings ready for electro-deposition on automobile and electric appliance parts; and surface protective coatings on magnetic powder used in electrophotographic carriers.

Where the substrates are made of plastics, the organosilicone resin emulsion compositions may be used as surface protective coatings on plastic plates, magnetic or thermographic recording film, wrapping films and vinyl cloth; and function-imparting binders.

Where the substrates are made of wood or paper, the organosilicone resin emulsion compositions are applicable as surface protective coatings on ply wood, surface protective coatings on thermographic recording media, and water-proofing coatings on printed surfaces. Due to water repellency, they are also applicable as surface protective coatings on synthetic leather or the like, and water-soluble binders for water-proof printing ink.

Where the substrates are made of inorganic materials, the organosilicone resin emulsion compositions are applicable as surface protective coatings or surface treating paint on exterior wall members of mortar, concrete or cement, ceramic panels, ALC plates, siding boards, gypsum boards, brick, glass, porcelain, synthetic marble and the like.

Further the organosilicone resin emulsion compositions may be used as a base polymer in adhesives and when combined with other organic resins or silane coupling agents, form adhesives which are effective for establishing a bond between substrates of different materials.

In applying the organosilicone resin emulsion compositions of the invention to substrates, any of well-known coating methods such as dipping, spraying, roll coating and brush coating may be employed. Although the coating weight of the organosilicone resin emulsion composition is not particularly limited, it is usually coated so as to give a coating thickness of 0.1 to 1,000 μm, especially 1 to 100 μm after drying.

If it is desired to use the organosilicone resin emulsion composition as a protective coating in an uncured state, the coated substrate may be held at room temperature, allowing the water and the solvent as component (B) to volatilize off. If it is desired for the emulsion composition to crosslink through room temperature curing until a high hardness coating is obtained, the substrate coated with the emulsion composition having a condensation catalyst added thereto is typically held at room temperature for 0.1 to 30 days, yielding a satisfactory cured coating. If it is desired for the emulsion composition to crosslink through heat curing until a high hardness film is obtained, the substrate coated with the emulsion composition which may or may not contain a condensation catalyst is typically heated at a temperature in the range of 50 to 300° C. for 0.5 minute to 200 hours.

EXAMPLE

Examples and Comparative Examples are given below for illustrating the present invention, but the invention is not limited thereto. In Examples, all percents are by weight, the viscosity is measured at 25° C. by a Brookfield rotational viscometer BM model, the average particle size is measured by a particle size distribution instrument N4Plus (Coulter). The emulsifiers used include Noigen XL40 (Dai-ichi Kogyo Seiyaku Co., Ltd., polyoxyalkylene decyl ether, HLB 10.5), Noigen XL400 (Dai-ichi Kogyo Seiyaku Co., Ltd., polyoxyalkylene decyl ether, HLB 18.4), and Newcol 291M (Nippon Nyukazai Co., Ltd., 75% sodium alkylsulfosuccinate solution).

Example 1

A distillation system connected to a vacuum pump was charged with 1 kg of a 50% xylene solution of an organosilicone resin of the formula: $[(CH_3)SiO_{3/2}]_{0.65}[(C_6H_5)SiO_{3/2}]_{0.35}$ and 125 g of butyl cellosolve acetate (SP=8.9), after which the xylene was distilled off under conditions: 60° C. and 20 mmHg. After 3 hours, gas chromatography analysis was performed to find a xylene content of 0.1% and a butyl cellosolve acetate content of 19.8%. This butyl cellosolve acetate solution of organosilicone resin had a nonvolatile content of 80.1% and a viscosity of 6,100 mPa·s.

By emulsifying 500 g of the butyl cellosolve acetate solution of organosilicone resin (silicone resin/butyl cellosolve acetate=80.1/19.8 in weight ratio), 25 g of Noigen XL40, 25 g of Noigen XL400, 5 g of Newcol 291M as emulsifiers, and 445 g of deionized water in a high-speed disperser Homodisper (Tokushu Kika Kogyo Co., Ltd.), a bluish white emulsion A was prepared. This emulsion had an average particle size of 210 nm and remained unseparated after one month aging at room temperature.

Example 2

A distillation system connected to a vacuum pump was charged with 1 kg of a 50% toluene solution of an organosilicone resin of the formula: $[(CH_3)SiO_{3/2}]_{0.15}[(C_6H_5)SiO_{3/2}]_{0.35}[(CH_3)_2SiO]_{0.30}[(C_6H_5)_2SiO]_{0.20}$ and 125 g of butyl cellosolve acetate (SP=8.9), after which the toluene was distilled off under conditions: 60° C. and 30 mmHg. After 3 hours, gas chromatography analysis was performed to find a toluene content of 0% and a butyl cellosolve acetate content of 19.9%. This butyl cellosolve acetate solution of organosilicone resin had a nonvolatile content of 80.1% and a viscosity of 6,500 mPa·s.

By emulsifying 500 g of the butyl cellosolve acetate solution of organosilicone resin (silicone resin/butyl cellosolve acetate=80.1/19.9 in weight ratio), 25 g of Noigen XL40, 25 g of Noigen XL400, 5 g of Newcol 291M as emulsifiers, and 445 g of deionized water in a high-speed disperser Homodisper, a bluish white emulsion B was prepared. This emulsion had an average particle size of 250 nm and remained unseparated after one month aging at room temperature.

Example 3

A distillation system connected to a vacuum pump was charged with 1 kg of a 50% xylene solution of an organosilicone resin of the formula: $[(CH_3)SiO_{3/2}]_{0.65}[(C_6H_5)SiO_{3/2}]_{0.35}$ and 125 g of butyl cellosolve (SP=8.9), after which the xylene was distilled off under conditions: 60° C. and 20 mmHg. After 3 hours, gas chromatography analysis was performed to find a xylene content of 0.3% and a butyl cellosolve content of 19.5%. This butyl cellosolve solution of organosilicone resin had a nonvolatile content of 80.2% and a viscosity of 6,900 mPa·s.

By emulsifying 500 g of the butyl cellosolve solution of organosilicone resin (silicone resin/butyl cellosolve=80.2/19.5 in weight ratio), 25 g of Noigen XL40, 25 g of Noigen XL400, 5 g of Newcol 291M as emulsifiers, and 445 g of deionized water in a high-speed disperser Homodisper, a bluish white emulsion C was prepared. This emulsion had an average particle size of 230 nm and remained unseparated after one month aging at room temperature.

Comparative Example 1

A distillation system connected to a vacuum pump was charged with 1 kg of a 50% xylene solution of an organosilicone resin of the formula: $[(CH_3)SiO_{3/2}]_{0.65}[(C_6H_5)SiO_{3/2}]_{0.35}$ (SP=8.8), after which the xylene was distilled off under conditions: 60° C. and 40 mmHg. After 3 hours, a nonvolatile content was measured to find a xylene content of 20.1%. This xylene solution of organosilicone resin had a nonvolatile content of 79.9% and a viscosity of 5,700 mPa·s.

By emulsifying 500 g of the xylene solution of organosilicone resin (silicone resin/xylene=79.9/20.1 in weight ratio), 25 g of Noigen XL40, 25 g of Noigen XL400, 5 g of Newcol 291M as emulsifiers, and 445 g of deionized water in a high-speed disperser Homodisper, a white emulsion D was prepared. This emulsion had an average particle size of 620 nm and separated after 3 day aging at room temperature.

Comparative Example 2

A distillation system connected to a vacuum pump was charged with 1 kg of a 50% toluene solution of an organosilicone resin of the formula: $[(CH_3)SiO_{3/2}]_{0.15}[(C_6H_5)SiO_{3/2}]_{0.35}[(CH_3)_2SiO]_{0.30}[(C_6H_5)_2SiO]_{0.20}$ and 800 g of n-butanol (SP=11.4), after which the toluene and n-butanol were distilled off under conditions: 50° C. and 50 mmHg. After 4 hours, gas chromatography analysis was performed to find a toluene content of 3.4% and an n-butanol content of 18.6%. This butanol solution of organosilicone resin had a nonvolatile content of 78.0% and a viscosity of 4,600 mPa·s.

By emulsifying 500 g of the butanol solution of organosilicone resin (silicone resin/butanol=78.0/18.6 in weight ratio), 25 g of Noigen XL40, 25 g of Noigen XL400, 5 g of Newcol 291M as emulsifiers, and 445 g of deionized water in a high-speed disperser Homodisper, a white emulsion E was prepared. This emulsion separated within several hours.

Examples 4 to 7 and Comparative Example 3

The cured coatings of Emulsions A and B obtained in Examples 1 and 2, respectively, were assayed as follows. Compositions of the formulation shown in Table 1 were coated on clean surfaces of cold rolled steel strips and cured under the conditions shown in Table 1, forming cured coatings of about 20 μm thick. The cured coatings were assayed for transparency by visual observation, scratch hardness according to JIS K5600 (pencil method), adhesion by a crosscut test using Cellophane® adhesive tape, and weathering after 1,000 hour exposure by means of a sunshine long-life weatherometer.

TABLE 1

| | | Example | | | | Comparative Example |
|---|---|---|---|---|---|---|
| | | 4 | 5 | 6 | 7 | 3 |
| Formulation (pbw) | Emulsion A | 100 | 100 | | 50 | |
| | Emulsion B | | | 100 | | |
| | Acrylic emulsion F | | | | 50 | 100 |
| | 5% aqueous solution of sodium acetate | | 10 | 10 | | |
| Curing conditions | Temperature (° C.) | 150 | 80 | 80 | 150 | 150 |
| | Time (min) | 30 | 15 | 15 | 30 | 30 |
| Transparency | | ○ | ○ | ○ | ○ | ○ |
| Scratch hardness | | 6 H | 6 H | B | 6 H | 6 H |
| Adhesion | | 100/100 | 100/100 | 100/100 | 100/100 | 100/100 |
| Weathering | | ○ | ○ | ○ | ○ | Δ |

Acrylic emulsion F is Polydurex G620 by Asahi Kasei Chemicals Corp.

Transparency was rated with symbol "○" for colorless transparent, "Δ" for translucent, and "×" for white turbid.

Weathering was rated with symbol "○" for no appearance change and no coloring, "Δ" for poor bond and slight yellowing, and "×" for separation and yellowing.

Example 8

A distillation system connected to a vacuum pump was charged with 1 kg of a 50% toluene solution of an organosilicone resin of the formula: $[(CH_3)SiO_{3/2}]_{0.75}[(CH_3)_2SiO]_{0.25}$ and 25 g of butyl cellosolve acetate (SP=8.9), after which the toluene was distilled off under conditions: 60° C. and 30 mmHg. After 3 hours, gas chromatography analysis was performed to find a toluene content of 0% and a butyl cellosolve acetate content of 4.9%. This butyl cellosolve acetate solution of organosilicone resin had a nonvolatile content of 95.1% and a viscosity of 176,000 mPa·s.

By emulsifying 500 g of the butyl cellosolve acetate solution of organosilicone resin (silicone resin/butyl cellosolve acetate=95.1/4.9 in weight ratio), 25 g of Noigen XL40, 25 g of Noigen XL400, 5 g of Newcol 291M as emulsifiers, and 445 g of deionized water in a high-speed disperser Homodisper, a white emulsion G was prepared. This emulsion had an average particle size of 340 nm and remained unseparated after one month aging at room temperature.

Example 9

A distillation system connected to a vacuum pump was charged with 1 kg of a 50% toluene solution of an organosilicone resin of the formula: $[(CH_3)SiO_{3/2}]_{0.4}[(CH_3)_2SiO]_{0.6}$ and 12 g of butyl cellosolve acetate (SP=8.9), after which the toluene was distilled off under conditions: 60° C. and 30 mmHg. After 3 hours, gas chromatography analysis was performed to find a toluene content of 0% and a butyl cellosolve acetate content of 2.4%. This butyl cellosolve acetate solution of organosilicone resin had a nonvolatile content of 97.6% and a viscosity of 136,000 mPa·s.

By emulsifying 500 g of the butyl cellosolve acetate solution of organosilicone resin (silicone resin/butyl cellosolve acetate=97.6/2.4 in weight ratio), 25 g of Noigen XL40, 25 g of Noigen XL400, 5 g of Newcol 291M as emulsifiers, and 445 g of deionized water in a high-speed disperser Homodisper, a white emulsion H was prepared. This emulsion had an average particle size of 360 nm and remained unseparated after one month aging at room temperature.

Japanese Patent Application Nos. 2005-015807 and 2005-186264 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An organosilicone resin emulsion composition, comprising:
    (A) 100 parts by weight of an organosilicone resin having the compositional formula: $[RSiO_{3/2}]_m[R_2SiO]_n$ wherein
        each R is selected from the group consisting of a methyl group and a phenyl group,
        m is a number of 0.2 to 1.0, and
        n is a number of 0 to 0.8;
    (B) 2 to 50 parts by weight of a water-miscible organic solvent which is a compound having an alkylene oxide unit and has a Hildebrand solubility parameter value of 8.0 to 11.0;
    (C) 1 to 50 parts by weight of an emulsifier; and
    (D) 25 to 2,000 parts by weight of water;
    said composition being substantially free of an organic solvent other than component (B), wherein the parts by weight of (B), (C), and (D) are relative to 100 parts by weight of (A).

2. The organosilicone resin emulsion composition of claim 1 wherein the water-miscible organic solvent (B) is selected from the group consisting of cellosolve, propyl cellosolve, butyl cellosolve, propylene glycol monomethyl ether, propylene glycol monobutyl ether, dipropylene glycol monomethyl ether, carbitol, methyl carbitol, propyl carbitol, butyl carbitol, cellosolve acetate, butyl cellosolve acetate, propylene glycol monomethyl ether acetate, carbitol acetate, and butyl carbitol acetate.

3. An article comprising a substrate and a coating of the organosilicone resin emulsion composition of claim 1 formed on a surface thereof.

4. The organosilicone resin emulsion composition of claim 1, wherein at least 30% of R groups are methyl groups and at least 10% of R groups are phenyl groups.

5. The organosilicone resin emulsion composition of claim 1, wherein m ranges from 0.4 to 1.0.

6. The organosilicone resin emulsion composition of claim 1 wherein component (B) is selected from the group consisting of butyl cellosolve, butyl cellosolve acetate, propylene glycol monomethyl ether, and propylene glycol monomethyl ether acetate.

7. The organosilicone resin emulsion composition of claim 1 wherein the emulsifier (C) is selected from the group consisting of a polyoxyethylene alkyl ether, a polyoxyethylene propylene alkyl ether, a polyoxyethylene alkyl phenyl ether, a polyoxyethylene fatty acid ester, an alkysulfate, an alkylbenzenesulfonate, an alkylsulfosuccinate, an alkyiphosphate, a polyoxyethylene alkyl ether sulfate, a polyoxyethylene alkyl phenyl ether sulfate, a quaternary ammonium salt, an alkylamine acetic acid salt, an alkyl betaine, and an alkyl imidazoline.

8. The organosilicone resin emulsion composition of claim 1 wherein component (C) is selected from the group consisting of polyoxyethylene octyl ether, polyoxyethylene nonyl ether, polyoxyethylene decyl ether, polyoxyethylene propylene decyl ether, polyoxyethylene lauryl ether, polyoxyethylene propylene lauryl ether, polyoxyethylene tridecyl ether, polyoxyethylene propylene tridecyl ether, polyoxyethylene myristyl ether, polyoxyethylene cetyl ether, polyoxyethylene stearyl ether, polyoxyethylene octyl phenyl ether, polyoxyethylene nonyl phenyl ether, and polyoxyethylene styrenated phenyl ether.

9. The organosilicone resin emulsion composition of claim 1, wherein component (C) is present in an amount ranging from 3 to 20 parts by weight per 100 parts by weight of component (A).

10. The organosilicone resin emulsion composition of claim 1, wherein component (D) is present in an amount ranging from 50 to 1,000 parts by weight per 100 parts by weight of component (A).

11. The organosilicone resin emulsion composition of claim 1, exhibiting an average particle size ranging from 50 to 1,000 nm.

12. The organosilicone resin emulsion composition of claim 1, wherein m ranges from 0.3 to 1.0.

13. The organosilicone resin emulsion composition of claim 1, wherein m×n is in the range from 0.8 to 1.0.

14. The organosilicone resin emulsion composition of claim 1, wherein m×n is in the range from 0.9 to 1.0.

15. The organosilicone resin emulsion composition of claim 1, wherein said water-miscible organic solvent has a Hildebrand solubility parameter value of 8.5 to 10.5.

16. The organosilicone resin emulsion composition of claim 1, wherein component (B) is present in an amount ranging from 3 to 40 parts by weight per 100 parts by weight of component (A).

17. The organosilicone resin emulsion composition of claim 1, wherein component (B) is present in an amount ranging from 5 to 30 parts by weight per 100 parts by weight of component (A).

* * * * *